(12) United States Patent
Liu et al.

(10) Patent No.: US 10,397,930 B2
(45) Date of Patent: Aug. 27, 2019

(54) RESOURCE AND POWER ALLOCATION INDICATION IN BEAM-BASED ACCESS SYSTEM

(71) Applicant: Futurewei Technologies, Inc., Plano, TX (US)

(72) Inventors: Bin Liu, San Diego, CA (US); Richard Stirling-Gallacher, San Diego, CA (US); Pengfei Xia, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/235,782

(22) Filed: Dec. 28, 2018

(65) Prior Publication Data

US 2019/0141712 A1    May 9, 2019

Related U.S. Application Data

(63) Continuation of application No. 15/471,279, filed on Mar. 28, 2017, now Pat. No. 10,194,445.

(51) Int. Cl.
*H04W 72/04* (2009.01)
*H04W 52/52* (2009.01)

(52) U.S. Cl.
CPC ....... *H04W 72/0473* (2013.01); *H04W 52/52* (2013.01); *H04W 72/042* (2013.01)

(58) Field of Classification Search
CPC ... H04W 88/08; H04W 52/08; H04W 52/143; H04W 52/146; H04W 52/18; H04W 52/325; H04W 52/38
See application file for complete search history.

(56) References Cited

U.S. PATENT DOCUMENTS

| 2012/0196591 | A1 | 8/2012 | O'Keefe et al. |
| 2013/0295852 | A1* | 11/2013 | Kim ............ H04W 16/28 455/63.4 |
| 2014/0185481 | A1 | 7/2014 | Seol et al. |
| 2016/0095003 | A1 | 3/2016 | Yu et al. |

FOREIGN PATENT DOCUMENTS

| CN | 1038945504 A | 7/2014 |
| CN | 104811267 A | 7/2015 |

* cited by examiner

*Primary Examiner* — Keith Ferguson
(74) *Attorney, Agent, or Firm* — Slater Matsil, LLP

(57) ABSTRACT

A method for resource and power allocation indication in a beam-based access system is provided. In an embodiment, a method for signaling power allocation in a beam-based access system includes determining, by a transmit point (TP), a relative effective transmit power offset between a control beam and a data beam. The method also includes signaling, by the TP, the relative effective transmit power offset to a user equipment (UE). The UE performs automatic gain control (AGC) on a control channel and a data channel according to the relative effective transmit power offset signaled by the TP.

27 Claims, 6 Drawing Sheets

RESOURCE AND POWER ALLOCATION INDICATION IN BEAM-BASED ACCESS SYSTEM

CROSS-REFERENCE TO RELATED APPLICATIONS

This application is a continuation of U.S. patent application Ser. No. 15/471,279, filed on Mar. 28, 2017, which application is hereby incorporated herein by reference in its entirety.

TECHNICAL FIELD

The present invention relates generally to a system and method of power allocation for wireless devices, and, in particular embodiments, to a system and method for resource and power allocation for wireless devices in a beam-based access system.

BACKGROUND

Beam based access, where the control channels and the data channels may use different beams, is currently an active topic of discussed in 5G New Radio (NR). As agreed in 5G NR, it is envisioned that a self-contained frame structure will be specified with downlink control followed by downlink data. In this system, the data and control may be transmitted in different downlink beams, which may have different beamforming gains. However, a beam switch between the control beam and the data beam may cause automatic gain control (AGC) jitter in user equipment (UE) reception due to abrupt receive power change from the control channel to the data channel.

SUMMARY

In accordance with an embodiment of the disclosure, a method for signaling power allocation in a beam-based access system includes determining, by a transmit point (TP), a relative effective transmit power offset between a control beam and a data beam. The method also includes signaling, by the TP, the relative effective transmit power offset to a UE. The UE performs AGC on a control channel and a data channel according to the relative effective transmit power offset signaled by the TP.

In accordance with an embodiment of the disclosure, a network component includes a processor and a computer readable storage medium storing programming for execution by the processor. The programming includes instructions for determining a relative effective transmit power offset between a control beam and a data beam. The programming also includes instructions for signaling the relative effective transmit power offset to a UE. The UE performs AGC on a control channel and a data channel according to the relative effective transmit power offset.

In accordance with an embodiment of the disclosure, a non-transitory computer-readable medium storing computer instructions for providing a power allocation indication in a beam-based access system is provided. The computer instructions, when executed by one or more processors, cause the one or more processors to perform the step of determining, with a transmit point, a relative effective transmit power offset between a control beam and a data beam. The computer instructions, when executed by one or more processors, also cause the one or more processors to perform the step of signaling, with the transmit point, the relative effective transmit power offset to a UE. The UE performs AGC on a control channel and a data channel according to the relative effective transmit power offset.

Optionally, in any of the preceding aspects, the signaling includes signaling via high layer signaling. Optionally, in any of the preceding aspects, the high layer signaling includes radio resource control (RRC) signaling. Optionally, in any of the preceding aspects, the signaling includes layer 1 signaling. Optionally, in any of the preceding aspects, the layer 1 signaling includes downlink control information (DCI) signaling. Optionally, in any of the preceding aspects, the relative effective transmit power offset is determined according to data beamforming gain, control beam forming gain, or both. Optionally, in any of the preceding aspects, the relative effective transmit power offset is determined according to a common transmit power. Optionally, in any of the preceding aspects, the relative effective transmit power offset corresponds to a precoder index or a beam index. Optionally, in any of the preceding aspects, the signaling includes two-stage signaling, wherein the relative effective transmit power offset is transmitted in a first stage and resource allocation is transmitted in a second stage.

An advantage of an embodiment of the present disclosure is that the UE may use the power offset information to perform fast AGC where the transmit power of the control beam and the transmit power of the data beam may be drastically different. Without the information regarding the power offset between the control beam and the data beam, the UE's performance may be degraded due to the otherwise unexpected change in power between the control beam and the data beam.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the embodiments.

In a beam-based access system, the effective transmit power from the TRP can be treated as a summation of actual transmit power and corresponding downlink beam beamforming gain. Data channel and control channel may be transmitted in different downlink beams, which may have different beamforming gain and transmit power. Considering a self-contained frame structure as specified in 5G NR, the use of two different beams may cause trouble in the UE AGC due to the abrupt receive power change from the control channel to the data channel.

Disclosed herein are methods and systems to provide a dynamic DL effective power indication for data transmissions to allow the UE to perform fast AGC for data reception. In an embodiment, a transmission point (TP) or other network component determines a relative effective transmit power offset between a control beam and a data beam. The TP or network component signals this power offset indication to the UE which uses the power offset information to perform fast AGC where the effective transmit power of the control channel and the effective transmit power of the data channel may be drastically different. In an embodiment, the effective transmit power is the summation of the transmit power and the beamforming gain. Without the information regarding the effective power offset between the control beam and the data beam, the UE's performance may be degraded due to the otherwise unexpected change in receive power between the control beam and the data beam. Furthermore, in high frequency, (HF), downlink power control is beneficial in data beams for better interference coordination between different cells, which introduces more dynamics in effective transmit power between data and control channel. A dynamic power indication for data transmission is disclosed for the UE to perform fast AGC for data reception.

A self-contained frame structure has been discussed and agreed to in 5G NR meetings. Each sub-frame is multiplexed with a downlink (DL) control region, an uplink (UL) control region, a data region (either a UL data region, a DL data region, or a DL data region followed by a UL data region), and a gap region. In some implementations, there can be DL only subframes or UL only subframes.

As used herein, the terms TP, transmission reception point (TRP), and access point (AP) are used interchangeably. In various embodiments, the TP may be a base station (BS), a base transceiver station (BTS), an eNodeB (eNB), a gNodeB (gNB), etc.

Figure 1:
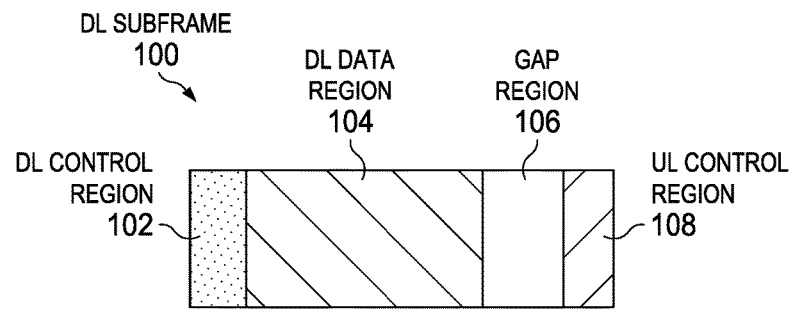
FIG. 1 shows a block diagram of an example structure of a self-contained frame.

FIG. 1 shows a block diagram of an example structure of a self-contained frame 100. Frame 100 includes a DL control region 102, a DL data region 104, a gap region 106, and a UL control region 108. There is no gap between the DL control region 102 and the DL data region 104.

Figure 2:
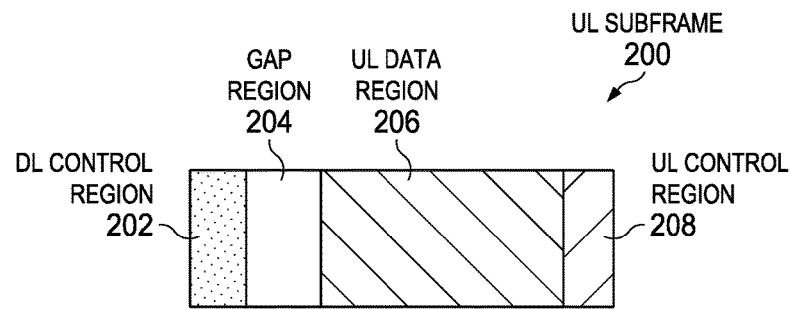
FIG. 2 shows a block diagram of another example structure of a self-contained frame.

FIG. 2 shows a block diagram of another example structure of a self-contained frame 200. Frame 200 includes a DL control region 202, a gap region 204, a UL data region 206, and a UL control region 208. There is no gap between the UL data region 206 and the UL control region 208.

The control channel transmissions (e.g., DL control region 102, UL control region 206) and the corresponding data channel transmissions (e.g., DL data region 104, UL data region 206) may use the same or different downlink or uplink beams.

In LTE, each Physical Downlink Control Channel (PDCCH) carries a message known as a Downlink Control Information (DCI), which includes resource assignments and other control information for a UE or a group of UEs. Several DCIs can be transmitted in one subframe. There are different DCI formats for different downlink/uplink transmission modes and control information. Table 1 below shows different DCI formats, the purpose of each, and the corresponding number of bits including CRC (for a system bandwidth of 50 Resource Blocks (RBs) and four antennas at eNodeB) for each DCI format.

TABLE 1

| DCI format | Purpose | Number of bits including CRC (for a system bandwidth of 50 RBs and four antennas at eNodeB) |
| --- | --- | --- |
| 0 | PUSCH grants | 42 |
| 1 | PDSCH assignments with a single codeword | 47 |
| 1A | PDSCH assignments using a compact format | 42 |
| 1B | PDSCH assignments for rank-1 transmission | 46 |
| 1C | PDSCH assignments using a very compact format | 26 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 3 | Transmit Power Control (TPC) commands for multiple users for PUCCH and PUSCH with 2-bit power adjustments | 42 |
| 3A | Transmit Power Control (TPC) commands for multiple users for PUCCH and PUSCH with 1-bit power adjustments | 42 |

In various embodiments, the transmit power offset can be in all or part of the DCI formats. In an embodiment, a new field is introduced for power offset indication.

For example, DCI format 2 is used for the transmission of resource assignments for PDSCH for closed-loop MIMO operation (transmission mode 4). In this example, the following information is transmitted:
Resource allocation type
Resource block assignment
Power control command for Physical Uplink Control Channel (PUCCH)
Hybrid Automatic Repeat Request (HARQ) information
Modulation and coding schemes for each codeword
Number of spatial layers
Precoding information and indication of whether one or two codewords are transmitted on the Physical Downlink Shared Channel (PDSCH).

Figure 3:
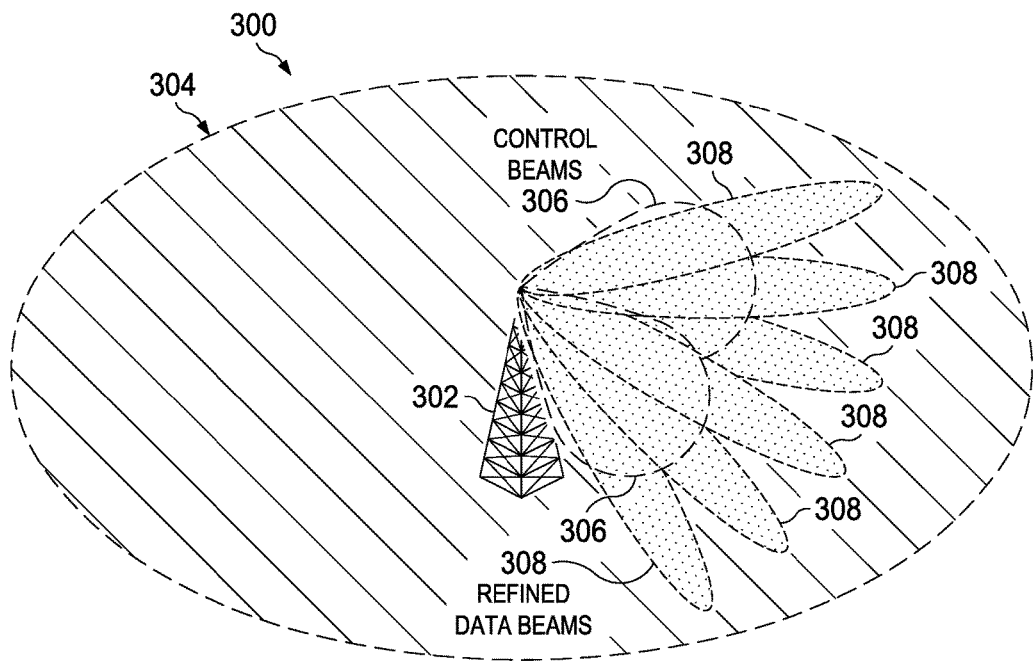
FIG. 3 is a diagram of an embodiment of a beam based access system.

FIG. 3 is a diagram of an embodiment of a beam based access system 300. The system 300 includes a TP 302 with a coverage area 304 for communicating with UEs. The TP 302 transmits control information on control beams 306 and data on the refined data beams 308. According to the agreement in RAN1#86bis, the control channel and the data channel may use different beams. The data beams 308 may be after further beam refinement with narrower beam width and higher beamforming gain compared to the control beams 306. The control beam/channel 306 may be shared by multiple UEs with a relatively wide beam width, as compared to the data beams 308, for robustness. The data beam/channel 308 serves a subset of UEs covered by a control beam/channel 306.

Figure 4:
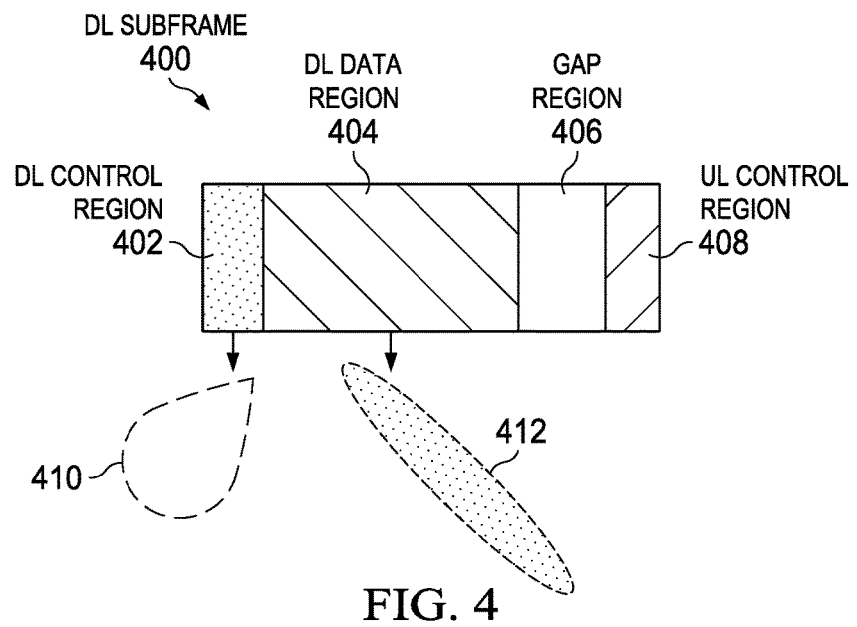
FIG. 4 is a diagram illustrating an embodiment of a self-contained DL subframe for use in a beam based access system.

FIG. 4 is a diagram illustrating an embodiment of a self-contained DL subframe 400 for use in a beam based access system. The self-contained DL subframe 400 includes a DL control region 402, a DL data region 404, a gap region 406, and a UL control region 408. In an embodiment, the DL data region 404 follows the DL control region 402. The DL control region is transmitted on a control beam 410 and the DL data region is transmitted on data beam 412. The control beam 410 and the data beam 412 have different beam widths and different beamforming gains. There will be an abrupt beamforming gain change between the control beam 410 (conveying the control channel) and the data beam 412 (conveying the data channel). Furthermore, the UE may need to switch the receive beams as well. Assuming the same transmit power is applied for data and control channel, due to the different beamforming gain, the UE may experience a sudden power change in the DL receive signal. The AGC in the UE receiver will need time to converge, which will impact the DL data reception. In an embodiment, for a fixed effective power difference between the control and data channel/beam, the effective power difference is indicated by high level signaling (e.g., RRC signaling).

Figure 5:
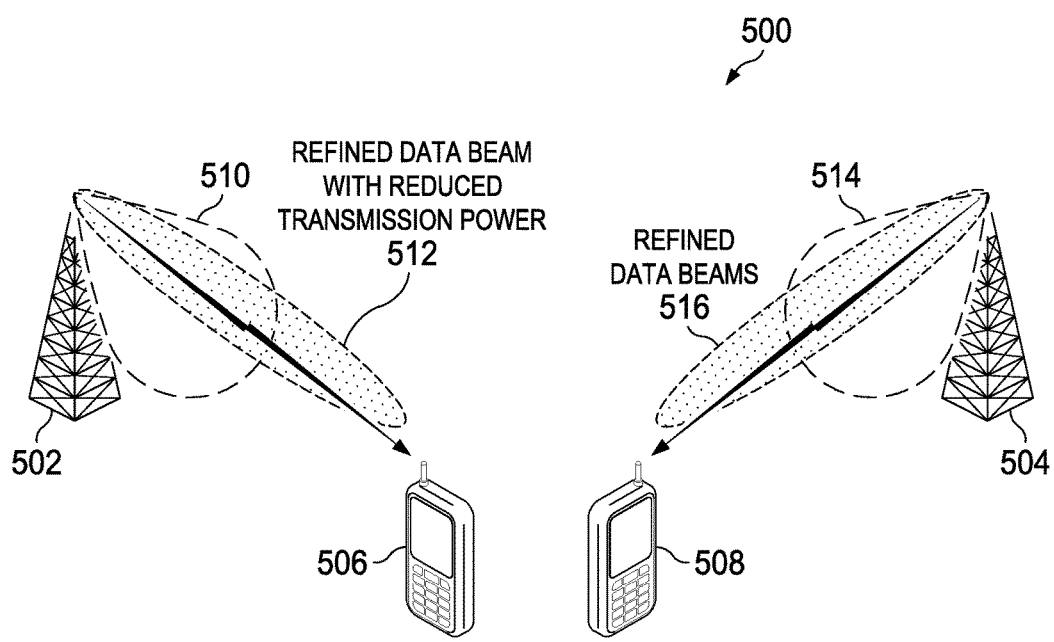
FIG. 5 is a diagram of an embodiment of a wireless network.

FIG. 5 is a diagram of an embodiment of a wireless network 500. Network 500 includes transmission reception points (TRPs) 502, 504 and UEs 506, 508. TP 502 transmits a control beam 510 and a data beam 512. TP 504 transmits control beam 514 and data beam 516. Data beam 512 is a refined data beam with reduced transmission power. Data beam 516 is a refined data beam.

In an embodiment, in high frequency (HF) transmission, DL power control is used for inter-TRP interference coordination. The effective DL transmission power may vary based on different interference situations. Again, as noted above, effect DL transmit power is a summation of the Tx power and beamforming gain. For example, in an embodiment, lower effective DL transmission power is allocated for UEs near the TRP to reduce interference to neighboring cells. In another embodiment, the TRP's beam-width is increased with reduced beamforming gain to support high mobility UEs, which may lead to less effective downlink transmit power. This dynamic power variation introduces another layer of complexity in the AGC in the UE receive chain.

In an embodiment, the TRP's 502, 504 each signal an effective transmit power difference indicator to respective ones of UEs 506, 508 to indicate the effective transmit power difference between the respective control beam 51o, 514 and the corresponding data beam 512, 516. The UEs 506, 508 use the effective transmit power difference to improve the AGC by being able to anticipate the abrupt power change between the control beam 51o, 514 and the data beam 512, 516.

In an embodiment, the UE 506, 508 may have to switch reception beams for data reception. This can add an extra offset factor to AGC. However, since the UE has full knowledge of the receive beamforming gain, this extra offset factor can be left for UE implementation. Thus, there is no information to be exchanged between the UE 506, 508 and the TRP 502, 504 for the purpose of AGC performance improvement in UE.

In an embodiment, multiple DL data channels/beams may be associated with a control channel/beam. In this case, separate power offset indication may be needed for each data channel/beam. The allocated data beam can be in or out of coverage of the control beam.

Figure 6:
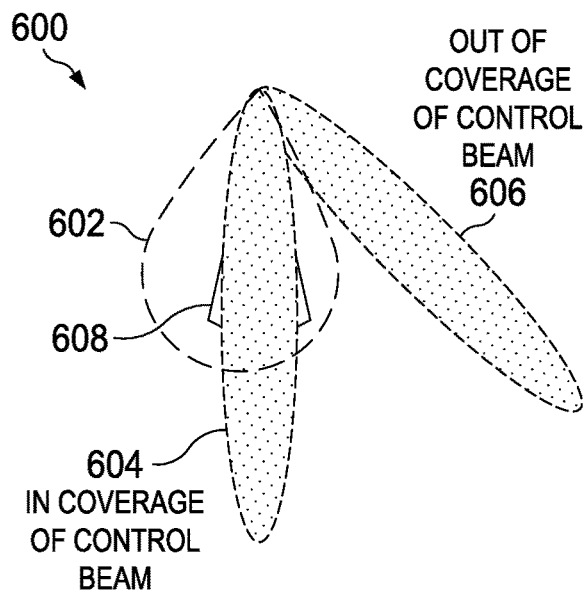
FIG. 6 is a diagram of a TRP system showing in and out of coverage data beams.

FIG. 6 is a diagram of a TRP system 600 showing in and out of coverage data beams. System 600 includes a TRP 608 transmitting a control beam 602 and data beams 604, 606. Data beam 604 is in coverage of the control beam 602. Data beam 606 is out of coverage of the control beam.

Figure 7:
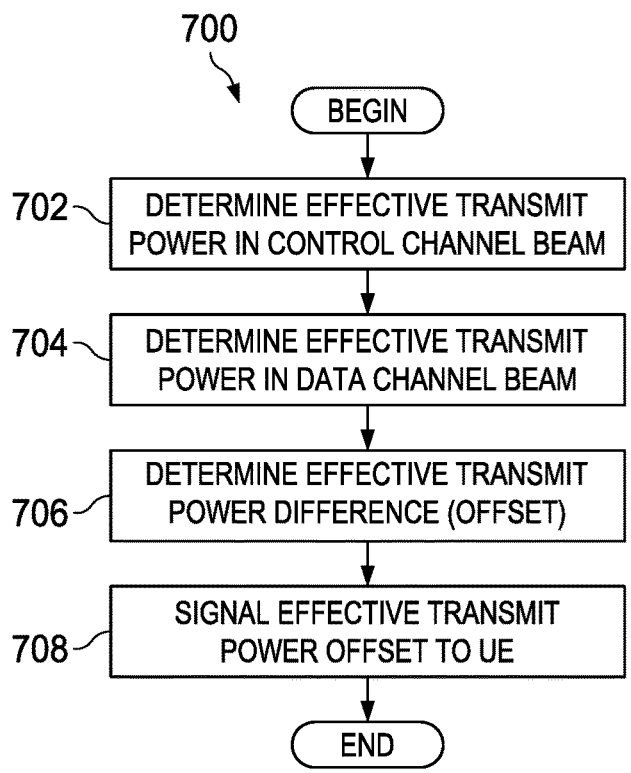
FIG. 7 is a flowchart illustrating an embodiment of a method for signaling a transmit power difference between control and data beams in a beam-based allocation system.

FIG. 7 is a flowchart illustrating an embodiment of a method 700 for signaling an effective transmit power difference between control and data beams in a beam-based access system. The method 700 begins at block 702 where the TP determines the beam used for control channel as well as the effective transmit power applied in the control beam. This determination may be based on, for example, the number and location of the UEs served by the TP. At block 704, the TP determines the beam used for data channel as well as the effective transmit power applied in a data beam to one or more UEs. The determination of the power and beam for the data channel to the one or more UEs may be determined according to the location of the one or more UEs and the distance of the one or more UEs from the TP. However, regardless of how the transmit powers for the control beam and the data beam are determined, the TP obtains the information about the transmission power setting in order to, at block 706, determine an effective transmit power difference (i.e., offset) between the control beam and the data beam. At block 708, the TP signals the effective transmit power offset to the one or more UEs. Each of the one or more UEs uses the effective transmit power offset to improve performance of AGC. In an embodiment, the effective transmit power offset is signaled in high layer signaling (e.g., RRC signaling). As used herein the term high layer signaling refers to any layer above the physical layer. In addition to RRC signaling (in the PDCP layer), other examples of high layer signaling include MAC CE signaling (in the MAC layer).

In an embodiment, an enhanced layer 1 signaling is used to signal the effective transmit power offset to the UE. To support fast AGC, a power reference for the data beam may be indicated to the UE in different formats. This example is an example of two-stage signaling with RRC signaling (high layer) for the nominal effective Tx power difference and DCI signaling (layer 1) for additional offset for the actual transmission.

For example, in a first case, a nominal effective transmit power difference between the control beam (conveying the control channel) and the data beam (conveying the data channel) is signaled by high layer signaling, such as RRC signaling. The nominal effective transmit power difference may be determined as:

Nominal effective transmit power difference=(Common Transmission power in the data channel+data beam beamforming gain)−(transmission power in the control channel+the control beam beamforming gain).

The layer 1 signaling (e.g., DCI) will further indicate the effective transmit power difference corresponding to the actual transmission power and/or beamforming gain that will be applied for data transmission in the associated DL data beam. In an embodiment, the effective transmit power difference is determined as:

Effective transmit power difference=Actual transmission power in the data beam−the common transmission power in the data beam assuming uniform data beam with the same beamforming gain.

In a second case, layer 1 signaling (e.g., DCI) indicates the effective transmit power difference between the control channel and the associated data channel. In this embodiment, the effective transmit power difference is determined as:

Effective transmit power difference=(actual transmission power in the data channel+the data beam beamforming gain)−(the transmission power in the control channel+the control beam beamforming gain).

In a third case, the UE is informed with the beamforming gain for the control channel and the data channel in other DL signaling, for example, in signaling for UL power control. Similar signaling can be specified as in case 1 or case 2, where no beamforming gain information is needed.

As noted above, the UE may have to switch reception beams for data reception which could add an extra offset factor to the AGC. However, since the UE has the full knowledge of the receive beamforming gain, this is left to UE implementation.

In an embodiment, two-stage DCI signaling is used to indicate the effective transmission power offset between the control and data beams to the UE. As discussed above, the control beam/channel may be shared by multiple UEs. Often times, the control beam in such cases will have a relatively wide beam width for robustness. The data beam/channel serves a subset of UEs covered by a control beam/channel. An efficient two-stage DCI can be specified. The LTE DCI format 2 is used as an example.

In stage 1, the following information is transmitted in the control channel, which may or may not be with a wide beam:
Precoding information/beam indices
Effective transmission power offset corresponding to each precoder/beam index
In various embodiments, this information can be UE specific or can be UE group specific.

In stage 2, the following information is transmitted in the data channel which may or may not be with a finer beam (such as, for example, ePDCCH in LTE):
Resource allocation type
Resource block assignment
Power control command for PUCCH
HARQ information
Modulation and coding schemes for each codeword
Number of spatial layers and precoding information.

In an embodiment, power control commands for PUCCH and HARQ information can also be conveyed in stage 1 for robustness.

By indicating the effective transmit power difference, the UE may enable fast AGC in the receiving DL data channel. Two-stage implementation provides efficient DCI signaling.

Figure 8:
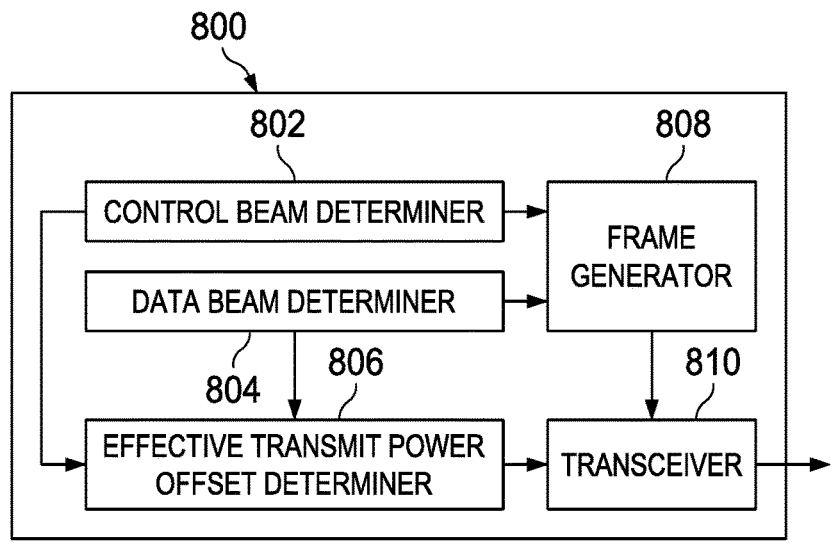
FIG. 8 is a block diagram of a system for determining and signaling a transmit power offset between a control beam and a data beam to a UE.

FIG. 8 is a block diagram of a system 800 for determining and signaling an effective transmit power offset between a control beam and a data beam to a UE. System 800 may be implemented in a TP. System includes a control beam determiner 802, a data beam determiner 804, an effective transmit power offset determiner 806, a frame generator 808, and a transceiver. The control beam determiner 802 determines the beam width and beam power for the control beam. The data beam determiner 804 determines the beam width and the beam power for the data beam. The data beam is specific to a particular UE or to a particular subset of UEs served by the system 800. The effective transmit power offset determiner 806 determines the effective transmit power offset according to the control beam power and beamforming gain determined by the control beam generator 802 and according to the data beam power and beamforming gain determined by the data beam generator 804. The effective transmit power offset determiner 806 encodes signaling with the effective transmit power offset and sends the signaling to the transceiver 810. The signaling can be high layer signaling or low layer signaling. The transceiver 810 transmits the high layer signaling with the effective transmit power offset to the UE (or UEs). The frame generator 808 generates self-contained frame where each sub-frame is multiplexed with a DL control region, a UL control region, a data region (UL, DL, or both), and a gap region. The control region is transmitted by the control beam and the data regions are transmitted by the data beams via the transceiver 810.

Figure 9:
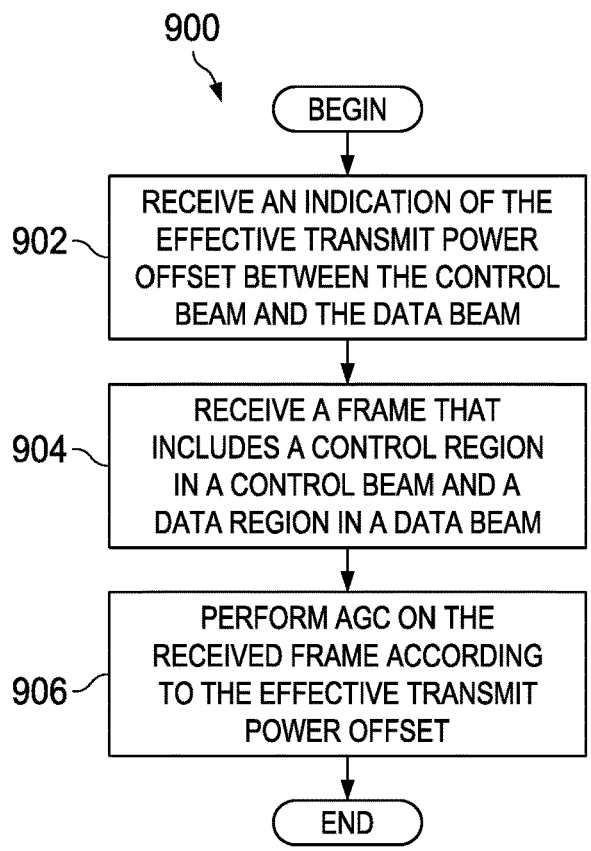
FIG. 9 is a flowchart of an embodiment of a method in a UE for decoding a received self-contained frame that includes a control region transmitted by a control beam and a data region transmitted by a data beam.

FIG. 9 is a flowchart of an embodiment of a method 900 in a UE for decoding a received self-contained frame that includes a control region transmitted by a control beam and a data region transmitted by a data beam. In an embodiment, there is no gap between the control region and the data region. The method 900 begins at block 902 where the UE receives an indication of the effective transmit power offset between the control beam and the data beam from a TP. The indication may be received via high layer signaling. At block 904, the UE receives a frame that includes a control region in a control beam and a data region in a data beam. At block 906, the UE performs AGC on the received frame according to the effective transmit power offset, after which, the method 900 may end.

Figure 10:
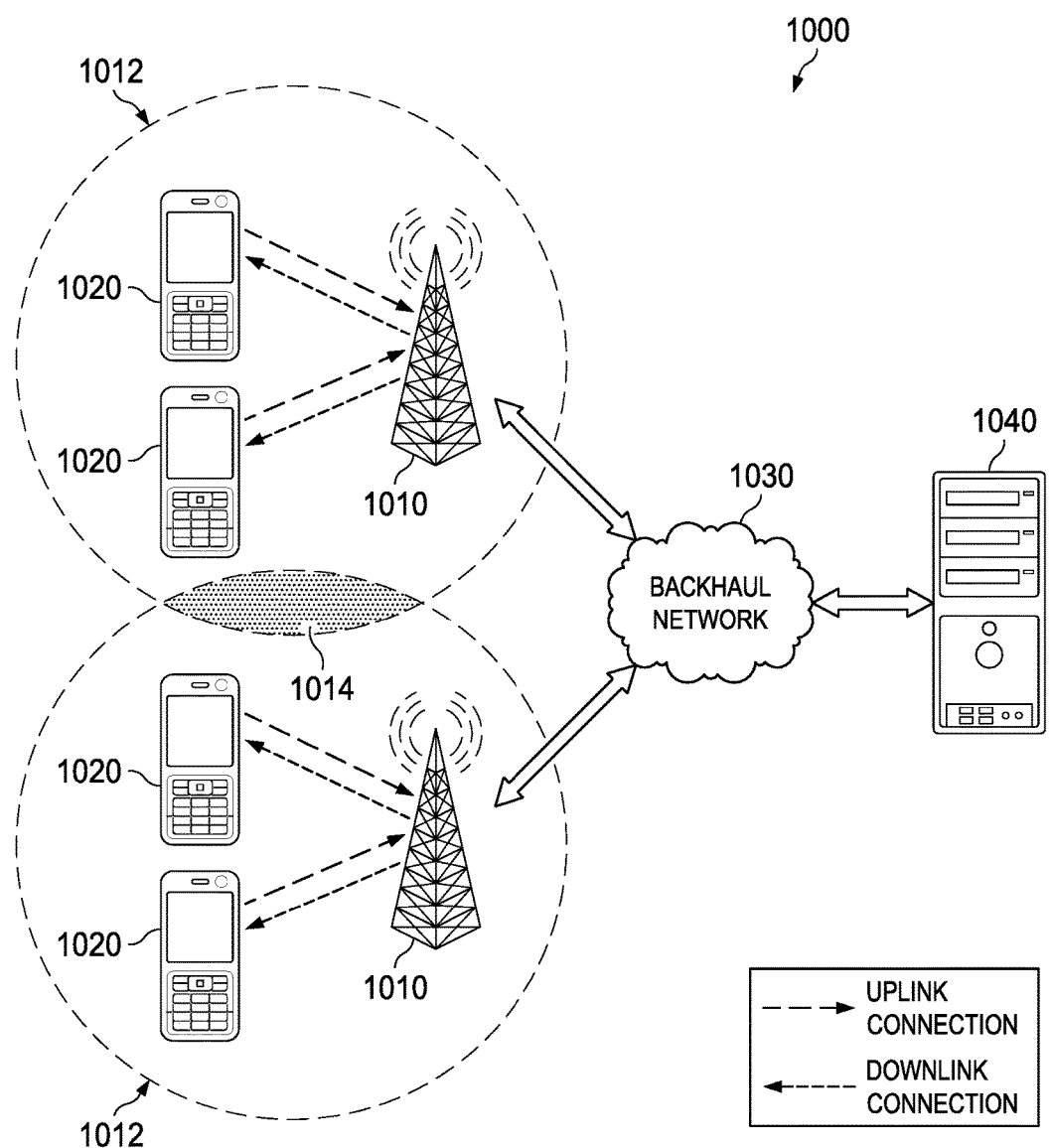
FIG. 10 illustrates a network for communicating data.

FIG. 10 illustrates a network 1000 for communicating data. The network 1000 comprises a plurality of access points (APs) 1010 each having a coverage area 1012, a plurality of user equipment (UEs) 1020, a backhaul network 1030, and a media server 1040. As used herein, the term AP may also be referred to as a transmission point (TP), a base station (BS), a base transceiver station (BTS), an eNB, or a gNB, and the terms may be used interchangeably throughout this disclosure. These coverage areas represent the range of each AP 1010 to adequately transmit data, and the coverage areas of adjacent APs 1010 may have some overlap 1014 in order to accommodate handoffs between APs 1010 whenever a UE 1020 exits one coverage area 1012 and enters an adjacent coverage area 1012. The AP 1010 may comprise any component capable of providing wireless access by, inter alia, establishing uplink (dashed line) and/or downlink (dotted line) connections with the UEs 1020, such as a base transceiver station (BTS), an enhanced base station (eNB), a femtocell, and other wirelessly enabled devices. The UEs 1020 may comprise any component capable of establishing a wireless connection with the AP 1010. For example, the UE 1020 may be a smartphone, a laptop computer, a tablet computer, a wireless telephone, etc. The UEs 1020 may also be referred to as wireless devices, mobile devices, or wireless mobile devices. The backhaul network 1030 may be any component or collection of components that allow data to be exchanged between the AP 1010 and a remote end (not shown). In some embodiments, the network 1000 may comprise various other wireless devices, such as relays, femtocells, etc.

The media server APs 1010 and UEs 1020 may provide auxiliary content delivery to other UEs 1020 or devices (not shown) according the systems and methods described herein. Network 1000 is merely an example of a network in which the disclosed methods and systems may be implemented.

Figure 11:
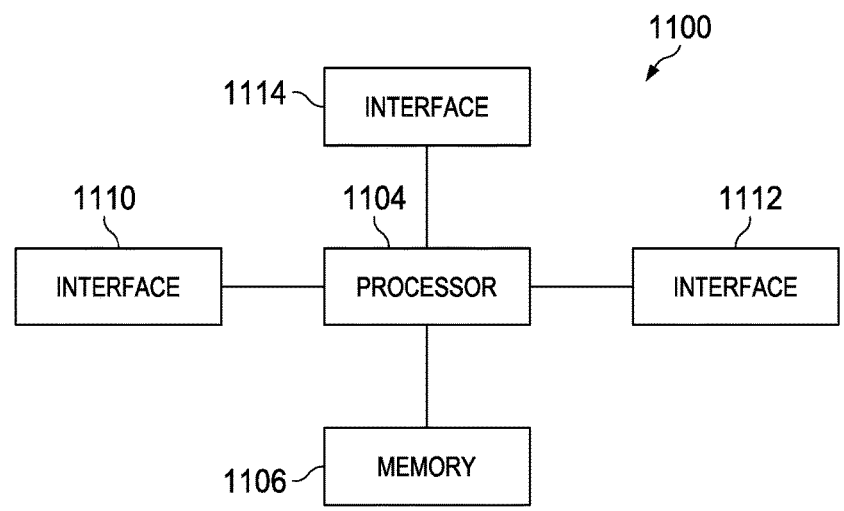
FIG. 11 illustrates a block diagram of an embodiment processing system for performing methods described herein, which may be installed in a host device.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1110, 1112, 1114 connects the processing system 1100 to a transceiver adapted to transmit and receive signaling over the telecommunications network.

Figure 12:
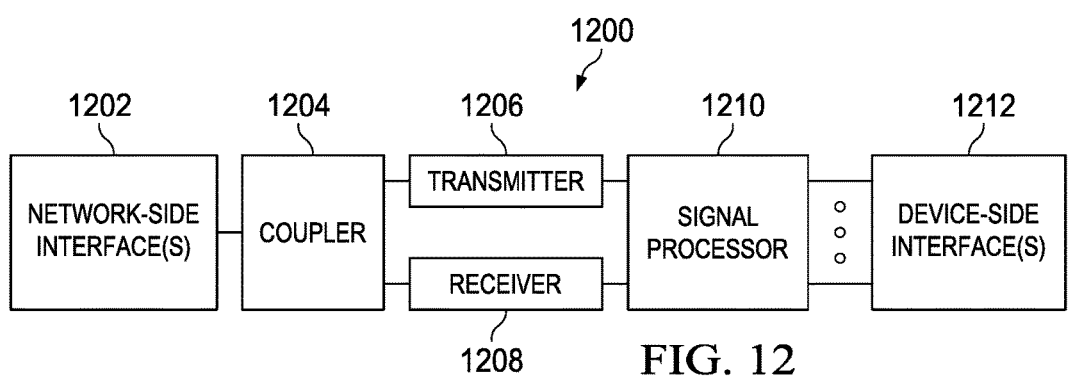
FIG. 12 illustrates a block diagram of a transceiver adapted to transmit and receive signaling over a telecommunications network.

FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method for signaling power allocation in a beam-based access system includes determining, by a transmit point (TP), a relative effective transmit power offset between a control beam and a data beam. The method also includes signaling, by the TP, the relative effective transmit power offset to a UE. The UE performs AGC on a control channel and a data channel according to the relative effective transmit power offset signaled by the TP.

In an embodiment, a network component includes a processor and a computer readable storage medium storing programming for execution by the processor. The programming includes instructions for determining a relative effective transmit power offset between a control beam and a data beam. The programming also includes instructions for signaling the relative effective transmit power offset to a UE. The UE performs AGC on a control channel and a data channel according to the relative effective transmit power offset.

In an embodiment, a non-transitory computer-readable medium storing computer instructions for providing a power allocation indication in a beam-based access system is provided. The computer instructions, when executed by one or more processors, cause the one or more processors to perform the step of determining, with a TP, a relative effective transmit power offset between a control beam and a data beam. The computer instructions, when executed by one or more processors, also cause the one or more processors to perform the step of signaling, with the TP, the relative effective transmit power offset to a UE. The UE performs AGC on a control channel and a data channel according to the relative effective transmit power offset signaled by the TP.

In an embodiment, data is transmitted in the data beam and at least some control information is transmitted in the data beam. In an embodiment, some of the control information is transmitted in the data beam. In an embodiment, the signaling includes signaling via high layer signaling. In an embodiment, the high layer signaling includes radio resource control (RRC) signaling. In an embodiment, the signaling includes layer 1 signaling. In an embodiment, the layer 1 signaling includes downlink control information (DCI) signaling. In an embodiment, the relative effective transmit power offset is determined according to data beamforming gain, control beam forming gain, or both. In an embodiment, the relative effective transmit power offset is determined according to a common transmit power. In an embodiment, the relative effective transmit power offset corresponds to a precoder index or a beam index. In an embodiment, the signaling includes two stage signaling, wherein the relative effective transmit power offset is transmitted in a first stage and resource allocation is transmitted in a second stage.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

While the embodiments have been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving, by a user equipment (UE) from a transmit point, signaling indicating a relative effective transmit power offset between a control beam and a data beam;
receiving, by the UE from the transmit point, a control channel in the control beam and a data channel in the data beam; and
performing, by the UE, automatic gain control (AGC) on the control channel and/or the data channel using the relative effective transmit power offset.

2. The method of claim 1, wherein receiving the signaling comprises receiving the signaling via a high layer signaling.

3. The method of claim 2, wherein the high layer signaling comprises radio resource control (RRC) signaling.

4. The method of claim 2, wherein receiving the signaling comprises receiving layer 1 signaling.

5. The method of claim 4, wherein the layer 1 signaling comprises downlink control information (DCI) signaling.

6. The method of claim 1, wherein the relative effective transmit power offset is based on data beamforming gain, control beam forming gain, or both.

7. The method of claim 1, wherein the relative effective transmit power offset is based on a common transmit power.

8. The method of claim 1, wherein the relative effective transmit power offset corresponds to a precoder index or a beam index associated with the data beam.

9. The method of claim 1, wherein the signaling comprises two stage signaling, and the method comprises:
receiving the relative effective transmit power offset in a first stage; and
receiving resource allocation in a second stage.

10. A user equipment (UE) comprising:
a non-transitory memory storage comprising instructions; and
one or more processors in communication with the non-transitory memory storage, wherein the one or more processors execute the instructions to:
receive, from a transmit point, signaling indicating a relative effective transmit power offset between a control beam and a data beam;
receive, from the transmit point, a control channel in the control beam and a data channel in the data beam; and
perform automatic gain control (AGC) on the control channel and/or the data channel using the relative effective transmit power offset.

11. The UE of claim 10, wherein the one or more processors execute the instructions to receive the signaling via a high layer signaling.

12. The UE of claim 11, wherein the high layer signaling comprises radio resource control (RRC) signaling.

13. The UE of claim 11, wherein the one or more processors execute the instructions to receive the signaling using layer 1 signaling.

14. The UE of claim 13, wherein the layer 1 signaling comprises downlink control information (DCI) signaling.

15. The UE of claim 10, wherein the relative effective transmit power offset is based on data beamforming gain, control beam forming gain, or both.

16. The UE of claim 10, wherein the relative effective transmit power offset is based on a common transmit power.

17. The UE of claim 10, wherein the relative effective transmit power offset corresponds to a precoder index or a beam index associated with a data beam.

18. The UE of claim 10, wherein the signaling comprises two stage signaling, and wherein the one or more processors execute the instructions to:
receive the relative effective transmit power offset in a first stage; and
receive resource allocation in a second stage.

19. A non-transitory computer-readable medium storing computer instructions, that when executed by one or more processors, cause the one or more processors to perform the steps of:
receive, with a user equipment (UE), signaling indicating a relative effective transmit power offset between a control beam and a data beam;
receive, with the UE, a control channel in the control beam and a data channel in the data beam; and
perform, with the UE, automatic gain control (AGC) on the control channel and/or the data channel using the relative effective transmit power offset.

20. The non-transitory computer-readable medium of claim 19, wherein the step of receiving the signaling comprises receiving a high layer signaling.

21. The non-transitory computer-readable medium of claim 20, wherein the high layer signaling comprises radio resource control (RRC) signaling.

22. The non-transitory computer-readable medium of claim 20, wherein the step of receiving the signaling comprises receiving layer 1 signaling.

23. The non-transitory computer-readable medium of claim 22, wherein the layer 1 signaling comprises downlink control information (DCI) signaling.

24. The non-transitory computer-readable medium of claim 19, wherein the relative effective transmit power offset is based on data beamforming gain, control beam forming gain, or both.

25. The non-transitory computer-readable medium of claim 19, wherein the relative effective transmit power offset is based on a common transmit power.

26. The non-transitory computer-readable medium of claim 19, wherein the relative effective transmit power offset corresponds to a precoder index or a beam index associated with a data beam.

27. The non-transitory computer-readable medium of claim 19, wherein signaling comprises two stage signaling, and wherein the step of receiving the signaling comprises:
   receiving the relative effective transmit power offset in a first stage; and
   receiving resource allocation in a second stage.

* * * * *